Sept. 15, 1953 N. B. NICHOLS ET AL 2,652,525
ELECTRIC MOTOR CONTROL
Filed Aug. 16, 1952

INVENTORS
NATHANIEL B. NICHOLS
JOSEPH P. ALOISIO
BY Elmer J. Gorn
ATTORNEY

Patented Sept. 15, 1953

2,652,525

UNITED STATES PATENT OFFICE 2,652,525

ELECTRIC MOTOR CONTROL

Nathaniel B. Nichols, Wellesley, and Joseph P. Aloisio, Somerville, Mass., assignors to Raytheon Manufacturing Company, Newton, Mass., a corporation of Delaware Application August 16, 1952, Serial No. 304,756

7 Claims. (Cl. 318—347)

1

This invention concerns an improvement in magnetic amplifiers, such as are described in the copending application of J. P. Aloisio on Motor Speed Control Systems, Serial No. 294,617, filed June 20, 1952.

In the above-mentioned application, the speed of a direct current electric motor is controlled by connecting the armature in series with a saturable reactor whose impedance is controlled by varying the degree of saturation through the application of direct current to control and feedback windings. The control current is supplied by the plate circuit of a gas-filled electron tube, which passes one-half wave of the alternating current supplied by a transformer connected to a source of alternating current. However, even when the control current is zero, there is a certain amount of residual magnetic field in the reactor due to current flow through the feedback winding. This residual field partly saturates the reactor, thereby lowering its impedance and narrowing the range of control. For this reason the lowest controllable speed attainable with a reactor of a given size is somewhat above that which would be realized were not the impedance of the reactor so lowered. The present invention corrects this by providing a magnetic field substantially equal and opposite to this residual magnetic field, using as a power source the half wave that is not passed by the above-mentioned electron tube.

The foregoing and other objects of the invention will be apparent from the following description of an exemplification thereof in conjunction with the accompanying drawing in which.

Figure 1:
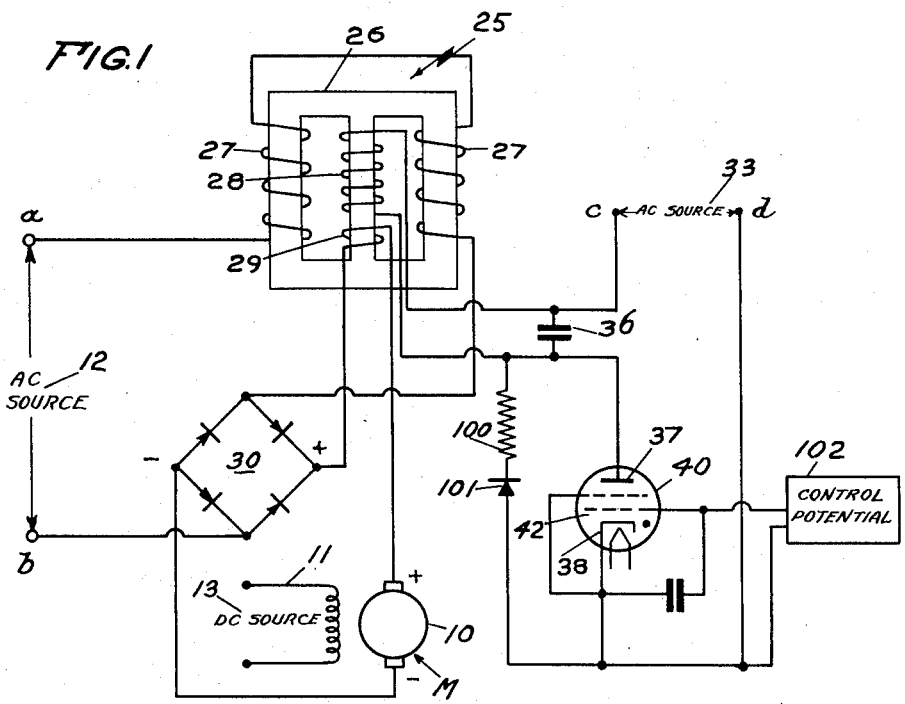
Fig. 1 is a circuit diagram of an electric motor control system incorporating an embodiment of the present invention.

Referring to Fig. 1, the direct current motor M, whose speed is to be controlled, comprises an armature 10 and a field winding 11. The field winding is energized by a suitable source of direct current 13. The controlling device, the saturable reactor 25, comprises a three-legged core 26, with reactance winding 27 wound on the outer legs and control winding 28 and feedback winding 29 on the center leg. Armature 10 is connected to a source of alternating current power 12 in series with full-wave rectifier 30, reactance winding 27, and feedback winding 29. The control winding 28 of saturable reactor 25

2 is connected in the plate circuit of a suitable controlled electrical space discharge rectifier, such as gas-filled tube 40, the power being supplied by a source of alternating current 33. A capacitor 36 serves to minimize the inductive effects of control winding 28. The grid 42 of tube 40 is connected to some suitable source of control potential from a control device 102, such as the device described in the above-mentioned copending application.

When the source of alternating current 12 is connected across points a and b, a current flows through reactance winding 27 to the input of full-wave rectifier 30. The voltage delivered to the rectifier depends on the source voltage and the voltage drop through reactance winding 27. The latter, in turn, depends on the impedance of winding 27 which varies with the degree of saturation of core 26. This change in impedance is accomplished by impressing additional magnetic fields in core 26 by means of control winding 28 in response to signals given by control device 102, as will be described below.

As the input voltage of rectifier 30 varies, its output, which is delivered to armature 10, is correspondingly changed. This control of armature voltage controls the speed of the motor.

When the tube 40 is conductive, speed control current flows in the control winding 28 of reactor 25 from terminal c, through the winding 28, to the anode 37, thence to the cathode 38, to terminal d. The current flow through tube 40 and hence through the control winding 28 is controlled by the potential impressed on grid 42, which is connected to the control device 102. Thus, control device 102, by regulating the flow of current through tube 40, controls the impedance of reactor 25, and thereby regulates the speed of motor M.

In order to gain effective control of the impedance of reactor 25, large changes in magnetic flux must be made which require large currents. In order to assist the control circuit, an additional winding 29 is placed on core 26 and connected in series with armature 10. When the armature current increases, whether due to an increase in armature voltage or to an increase in the load placed upon the motor, the current in feedback winding 29 is also increased, assisting the control winding in increasing the flux and in maintaining the desired control condition. In other words, the gain of the system is increased considerably by the use of the feedback winding.

It can be seen, however, that, even when the current in the control winding 28 is zero, at which time the impedance of reactor 25 should be at its maximum, there will be current flowing through feedback winding 29, as this winding is connected in series with armature 10. This creates a magnetic field in core 26 which decreases the impedance of reactor 25. In order for this device to have the widest range of control, it is necessary to utilize the full range of impedance of reactor 25, and this residual feedback current prevents the reactor from reaching its maximum impedance. In order to compensate for this field generated by the residual feedback current, an opposite field is generated in the control winding. Preferably this should be substantially equal to the field generated by the residual feedback current. This invention accomplishes this by connecting rectifier 101 and resistance 100 from the cathode to the plate of tube 40. During the half cycle when cathode 38 of tube 40 is negative, the control current flows from source 33 through tube 40 to the control windings, as described above. No current can flow through rectifier 101. However, during the other half cycle when tube 40 is nonconductive, current will flow from terminal $d$ through rectifier 101 and resistance 100, and through the control winding to terminal $c$ in a direction opposite to that of the control current. The size of this current is limited by resistor 100, which is so chosen that the field generated by this reverse pulse of current through the control winding perferably will be substantially equal to the field generated by the residual feedback current. Since control winding 28 has a large number of turns compared to feedback winding 29, a small current through the former will be able to cancel the magnetic field of the latter, and restore the device to its former balance.

Figure 2:
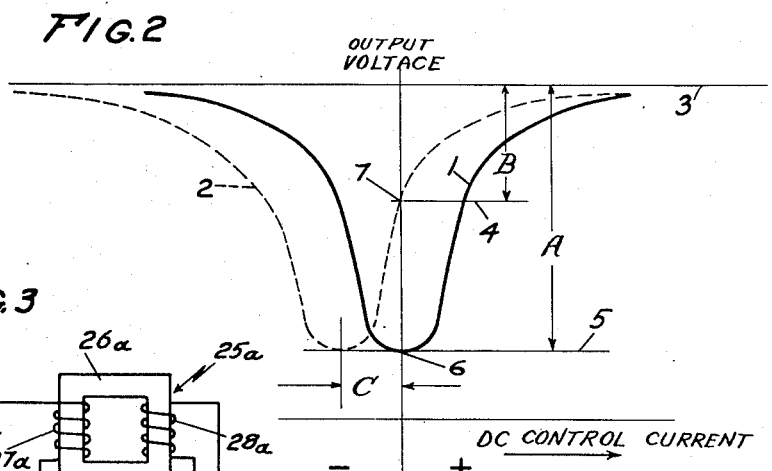
Fig. 2 is a set of curves illustrating certain operating characteristics of the invention.

Referring to Fig. 2, curve 1 is a normal curve of rectifier 30 output voltage versus control current when the reactor is unbiased. Where the control current is zero, the impedance is at its maximum value, and the output voltage is at its minimum value, represented by point 6. As the control current increases, the output rises, approaching a limit at a value where the reactor is saturated, represented by line 3. The range of control is the full range of the reactor, and is shown by the distance A. However, the biasing effect of the residual current in the feedback winding has the effect of a positive control current which shifts the curve to the left to a position shown by dotted curve 2 an amount equal to the effective feedback ampere turns, represented by the distance C. Thus, even with zero control current, the reactor is partly saturated and the output, represented by point 7, is considerably above the minimum, as represented by point 6. The range of control has been narrowed to the distance B. This shift, due to the residual feedback field, is corrected by applying a substantially equal and opposite field by the use of the reverse cycle of the control windings, as explained above, said equal and opposite field serving to move curve 2 back into coincidence with curve 1, thereby restoring the full range of control.

Figure 3:
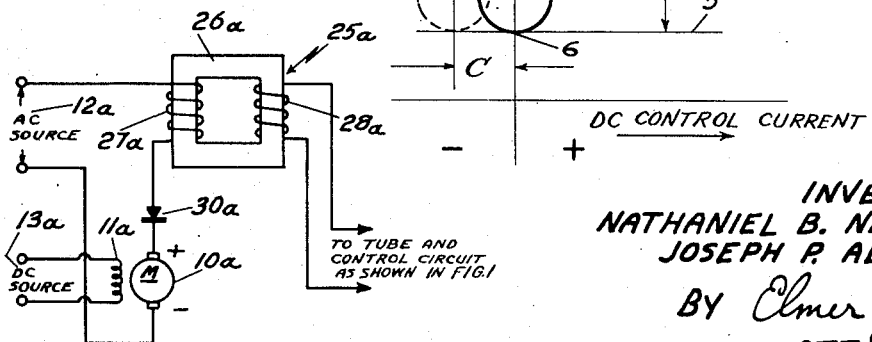
Fig. 3 is a partial circuit diagram of an alternative embodiment of the invention.

In cases where a half wave rectifier is used in the motor supply circuit, a direct current component of the alternating power passes through the reactance winding, and the simplified circuit shown in Fig. 3 can be used. Referring to the drawing, armature 10a of motor M is connected in series with alternating current source 12a, reactance winding 27a and half wave rectifier 30a.

Since rectifier 30a passes current in one direction only, a pulsating direct current passes through the reactance winding 27a, generating a magnetic field in core 26a of reactor 25a, the strength of this field being proportional to the current flowing in armature 10a of motor M. This proportional field serves the same purpose as the field generated by the series feedback winding shown in the first embodiment of the invention as shown in Fig. 1. The same problem of a residual field exists, and this field is substantially cancelled by a field generated by a reverse current sent through control winding 28a, as shown in the first embodiment described above.

This invention is not limited to the particular details of construction, materials, and devices described. Many equivalents will suggest themselves, as, for instance, rectifier 101 could be replaced with an electrical space discharge tube. Also, instead of regulating a motor, the novel control system could be used to control other types of loads. It is, accordingly, desired that the appended claims be given a broad interpretation commensurate with the scope of the invention.

What is claimed is:

1. An electric motor control system comprising an electric motor, a variable reactance comprising a saturable core, a reactance winding on said core, and a control winding and a feedback winding on said core for controlling the impedance of said reactance winding, a rectifier connected in series with said reactance winding to a source of alternating current, said motor being connected to the output of said rectifier in series with said feedback winding, said control winding being connected to the output circuit of a controlled rectifying electrical space discharge tube connected to a source of alternating current, a control device connected to said tube for controlling the current in its output circuit, a rectifier connected across said tube and polarized to pass the reverse cycle of said output current through said control winding, the impedance of said reactance being responsive to the current in said control winding.

2. An electric motor control system comprising an electric motor, a variable reactance comprising a saturable core, a reactance winding on said core, and a control winding and a feedback winding on said core for controlling the impedance of said reactance winding, a rectifier connected in series with said reactance winding to a source of alternating current, said motor being connected to the output of said rectifier in series with said feedback winding, said control winding being connected to the output circuit of a controlled rectifying electrical space discharge tube connected to a source of alternating current, a control device connected to said tube for controlling the current in its output circuit, a rectifier connected in series with a resistance across said tube and polarized to pass the reverse cycle of said output current through said control winding, said resistance being adapted to limit said reverse current so that the magnetomotive force generated by said current will be substantially equal to the magnetomotive force generated by residual current in said feedback winding, the impedance of said reactance being responsive to the current in said control winding.

3. An electric motor control system comprising a variable reactance including a reactance winding on a saturable core, a rectifier and a motor connected to a source of alternating current through said rectifier and reactance winding, means for impressing a direct current magnetomotive force on said core in response to the direct current flowing through the motor, a control winding on said core for controlling the impedance of said variable reactance, said control winding being connected to the output circuit of a controlled rectifying electrical space discharge tube connected to a source of alternating current, a control device connected to said tube for controlling the current in its output circuit, a rectifier connected across said tube and polarized to pass the reverse cycle of said output current through said control winding, the impedance of said reactance being responsive to the current in said control winding.

4. An electric control system comprising a load device adapted to cause a flow of direct current proportional to the load placed thereon, a variable reactance comprising a saturable core, a reactance winding on said core, and a control winding and a feedback winding on said core for controlling the impedance of said reactance winding, said load device being connected in series with said reactance winding to a source of alternating current, means for causing said proportional direct current to flow through said feedback winding, said control winding being connected to the output circuit of a controlled rectifying electrical space discharge tube connected to a source of alternating current, a control device connected to said tube for controlling the current in its output circuit, a rectifier connected across said tube and polarized to pass the reverse cycle of said output current through said control winding, the impedance of said reactance being responsive to the currents in said control windings.

5. An electric control system comprising a load device adapted to cause a flow of direct current proportional to the load placed thereon, a variable reactance comprising a saturable core, a reactance winding and a control winding on said core, and means for impressing a magnetomotive force proportional to said direct current in said core, said load device being connected in series with said reactance winding to a source of alternating current, means for causing said proportional direct current to flow through said magnetomotive means, said control winding being connected to the output circuit of a controlled rectifying electrical space discharge tube connected to a source of alternating current, a control device connected to said tube for controlling the current in its output circuit, a rectifier connected across said tube and polarized to pass the reverse cycle of said output current through said control winding, the impedance of said reactance being responsive to the currents in said control windings.

6. A self-biasing magnetic amplifier comprising a variable reactance, said reactance comprising a saturable core and a control winding on said core for controlling the impedance of said reactance winding, said control winding being connected to the output circuit of a controlled rectifying electrical space discharge tube connected to a source of alternating current, a control device connected to said tube for controlling the current in its output circuit, a rectifier connected across said tube and polarized to pass the reverse cycle of said output current through said control winding, the impedance of said reactance being responsive to the currents in said control windings.

7. A self-biasing magnetic amplifier comprising a variable reactance, said reactance comprising a saturable core, a control winding, and a reactance winding on said core for controlling the impedance of said reactance winding, said control winding being connected to the output circuit of a controlled rectifying electrical space discharge tube connected to a source of alternating current, a control device connected to said tube for controlling the current in its output circuit, a rectifier connected in series with a resistance across said tube and polarized to pass the reverse cycle of said output current through said control winding, said resistance being adapted to limit said reverse current to provide the desired bias, the impedance of said reactance being responsive to the currents in said control windings.

NATHANIEL B. NICHOLS.
JOSEPH P. ALOISIO.

No references cited.